United States Patent [19]

Price

[11] Patent Number: 4,899,222

[45] Date of Patent: Feb. 6, 1990

[54] MAGNETO-OPTIC AND FIBER-OPTIC DIGITAL PRINT HEAD

[76] Inventor: Edgar E. Price, 402 Giovanni Dr., Nokomis, Fla. 34275

[21] Appl. No.: 284,916

[22] Filed: Dec. 16, 1988

[51] Int. Cl.[4] .......................... G01D 9/42; G02F 1/09; G02B 5/30; G02B 6/00

[52] U.S. Cl. .................................... 358/296; 358/302; 346/107 R; 350/378; 350/96.18

[58] Field of Search ............... 346/108, 119 R, 107 R; 358/296, 302; 350/96.1, 96.18, 96.28, 374, 375, 376, 378, 379, 384, 389; 355/1

[56] References Cited

U.S. PATENT DOCUMENTS 4,482,214 11/1984 Hill .................................... 350/96.1

4,528,573 7/1985 Behrens .............................. 346/108

4,806,885 2/1989 Morimoto .......................... 350/378

*Primary Examiner*—Bruce A. Reynolds

*Assistant Examiner*—Scott A. Rogers

[57] ABSTRACT

SIGHT-MOD (tm) is a commercially available array of magneto-optic light modulators each of which can cause light to be transmitted or blocked in response to an electrical signal. By combining a SIGHT-MOD (tm) array with a passive array of optical fibers arranged at one end to match the positions of the SIGHT-MOD (tm) pixels and at the other end arranged in a straight line, together with optical illuminating and imaging elements, a completely solid state digital print head can be created capable of generating 300 or more dots of modulated light per inch.

18 Claims, 5 Drawing Sheets

MAGNETO-OPTIC AND FIBER-OPTIC DIGITAL PRINT HEAD

This application utilizes the principles described in U.S. Pat. No. 3,699,242, issued Oct. 17, 1972 and U.S. Pat. RE No. 29,094 reissued Dec. 28, 1976.

BACKGROUND OF THE INVENTION

Laser printers have been marketed for several years in various forms. In use a laser beam is focussed to a spot of light which is then caused to move across a line by a system of fixed lenses and mirrors rotating on a polygon. In one type of printer the line of spots is focussed onto a photoreceptor. As the photoreceptor moves in a direction at right angles to the line of spots an area of the photoreceptor is exposed to create an electrophotographic latent image. The image is made visible with toner which is then transferred to paper and fixed to make a permanent copy. The process can be repeated to make multiple copies. The data from which the copy is formed can be generated by a computer or from an original read with some sort of read-in device such as a charge coupled (CCD) array. These techniques are well under stood, exist in the art and are available in devices available in the marketplace.

A number of laser printers on the market use the CANON laser scanner and CANON electrophotographic engine. CANON has spent much effort to create a low cost laser scanner. This has been done by the application of innovative optical design and by judicious use of manufacturing tolerances to balance performance and cost effectiveness. The result is a laser scanner capable of generating 300 spots per inch. Laser scanners capable of generating more than 300 spots per inch become increasingly expensive as the number of spots per inch increases. There is a need for a low cost device to generate 300 or more spots per inch for use in page printers and other applications.

LED print heads with 360 dots per inch are a viable alternative to the laser scanner for use in page printers. A magneto-optic and fiber optic print head can have more than 360 dots per inch and the dots can be brighter than those in an LED print head.

SUMMARY OF THE INVENTION

SIGHT-MOD (tm) is a commercially available array of magneto-optic light modulators each of which can cause light to be transmitted or blocked in response to an electrical signal. By combining a SIGHT-MOD (tm) array with a passive array of optical fibers arranged at one end to match the positions of the SIGHT-MOD (tm) pixels and at the other end arranged in a straight line, together with optical illuminating and imaging elements, a completely solid state digital print head can be created capable of generating 300 or more dots of modulated light per inch.

DETAILED DESCRIPTION

Figure 1:
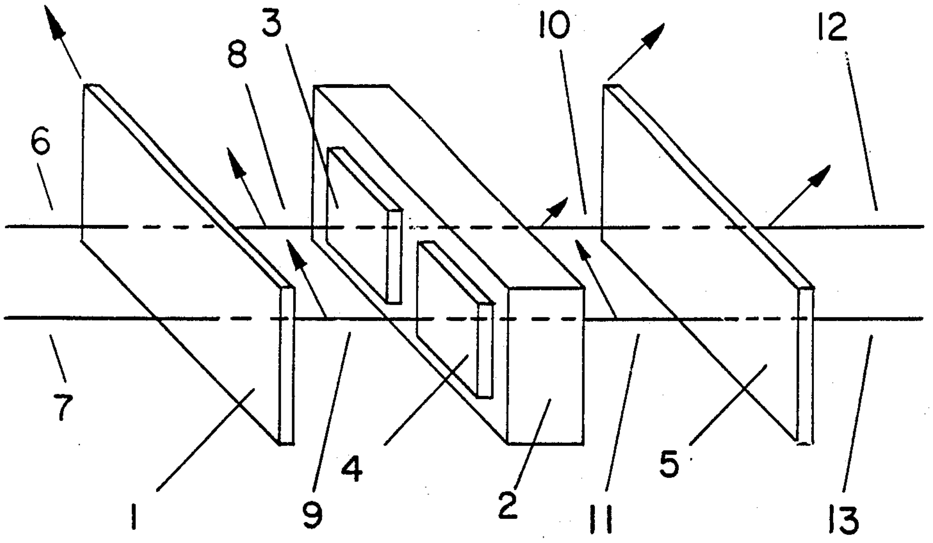
FIG. 1 shows the optical elements of a SIGHT-MOD (tm) array.

FIG. 1 shows the optical elements of a SIGHT-MOD (tm) array. SIGHT-MOD (tm) is an epitaxial garnet film grown on a non-magnetic substrate and processed using conventional semiconductor techniques into a two-dimensional array of pixels. In this application the optical elements of the SIGHT-MOD (tm) array are of interest, not the details of the manner in which light is controlled by the array in response to electrical signals. Refer to FIG. 1. 1 and 5 are sheets of polarizing material. In optical parlance polarizing sheet 1 is the "polarizer" and polarizing sheet 5 is the "analyzer". 2 is a non-magnetic transparent substrate on which pixels 3 and 4 of epitaxial garnet film are grown. 6 and 7 are light rays representative of unpolarized beams of light. Polarizer 1 converts unpolarized light rays 6 and 7 into polarized light rays 8 and 9 representative of polarized beams of light. Pixels 3 and 4, in response to electrical signals in circuit configurations not shown, impart Faraday rotation of 90 degrees to the planes of polarization of light rays 8 and 9 as they traverse pixels 3 and 4. If no electrical signals are applied to pixels 3 and 4 no Faraday rotation is imparted to light rays 8 and 9. Light rays 10 and 11 represent light rays 8 and 9 after traversing pixels 3 and 4 respectively. As shown in FIG. 1 only pixel 3 has had an electrical signal applied. Thus the plane of polarization of light ray 10 has been rotated by 90 degrees but the plane of polarization of light ray 11 is unaffected. Differences in the angles of the planes of polarization of light rays 10 and 11 are translated into differences in light intensity in light rays 12 and 13 by analyzer 5. The degree of contrast between light rays 12 and 13, representative of beams of analyzed polarized light, can be controlled by the relative angular positions of polarizing sheets 1 (polarizer) and 5 (analyzer). In the case illustrated light ray 10 is transmitted by polarizing sheet 5 (analyzer) to become light ray 12, but light ray 11 is completely blocked by analyzer 5 so that light ray 13 has as near to zero intensity as the efficiency of the crossed palarizer 1 and analyzer 5 will allow. As shown light rays 8, 10, and 12 are continuations of light ray 6 modified as described. Similarly light rays 9, 11, and 13 are continuations of light ray 7 modified as described. Light rays 6 and 7 are parallel to each other and perpendidicular to sheet polarizers 1 and 5, non-magnetic substrate 2, and pixels 3 and 4. Rotations of sheet polarizers 1 and 5 are about axes parallel to light rays 6 and 7. As described above pixels 3 and 4 function as magneto-optic light modulators on different parts of the surface of non-magnetic substrate 2, a single body. Since pixels 3 and 4 are coated onto the surface of transparent non-magnetic substrate 2 and held in place by molecular attraction, they can also be considered to be within a single body. Although only two pixels are shown they are considered to be indicative of a larger number of pixels in a square or rectangular array. The square or rectangular array of magneto-optic light modulators is arranged in accordance with a pre-determined pattern. Thus, the SIGHT-MOD (tm) array is one form of a plurality or a multiplicity of magneto-optic light modulators arranged in accordance with a pre-determined pattern on different parts of the surface of a single body or within a single body.

The optical behavior of the assembly shown in FIG. 1 would be exactly as described if pixels 3 and 4 were on the opposite face of substrate 2 except that the light rays 8 and 9 would first pass through substrate 2 before having Faraday rotation impressed on them by pixels 3 and 4.

Figure 2:
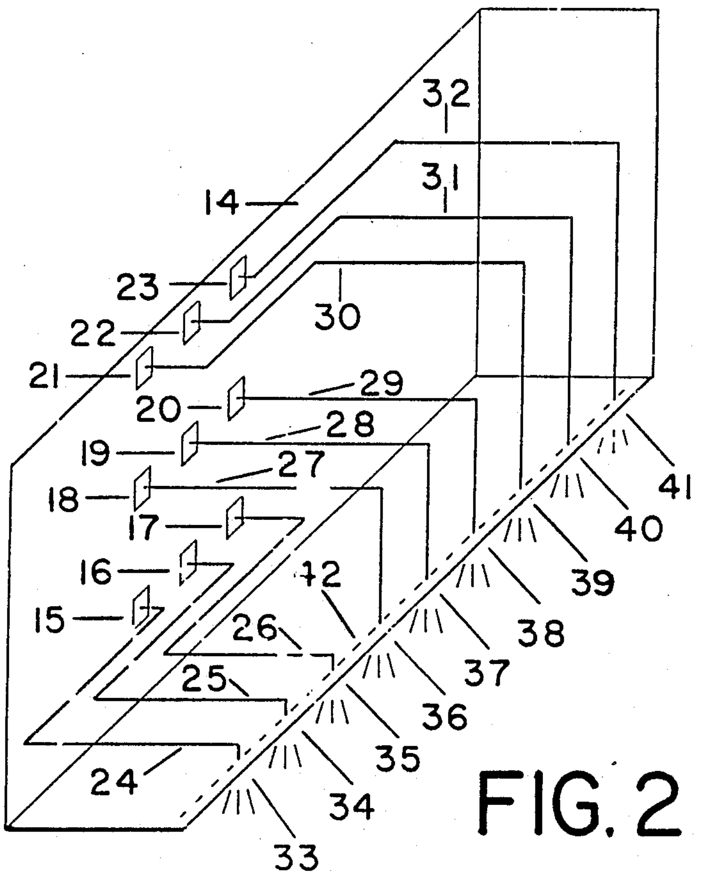
FIG. 2 illustrates the concept for creating a line of modulated spots of light using a SIGHT-MOD (tm) device in an assembly with polarizers and optical fibers.

FIG. 2 illustrates the concept for creating a line of modulated spots of light using a SIGHT-MOD (tm) device in an assembly with polarizers and optical fibers. 14 represents a complete SIGHT-MOD (tm) device as shown in FIG. 1 and described above. FIG. 1 is an exploded view. In FIG. 2, 14 is a compressed view with polarizer, pixels, substrate and polarizing analyzer closely spaced. The rectangles 15 through 23 represent pixels of a SIGHT-MOD (tm) device. For clarity in illustrating principle an array of 3 by 3 pixels is shown although 48 by 48 and 128 by 128 arrays are currently being produced and other configurations are possible. As shown in FIG. 2 pixels 15, 16, and 17 are in a horizontal straight line; pixels 18, 19, and 20 are in a second separate horizontal straight line above the first; and pixels 21, 22, and 23 are in a third horizontal straight line above the second. Although the pixels are behind he polarizing analyzer, they are shown here as visible through it. The three lines of pixels represent a more generalized plurality or multiplicity of magneto-optic light modulators arranged in accordance with a predetermined pattern on different parts of the surface of a single body, or within a single body.

The input ends and regions of optical fibers 24 through 32 are arranged in a predetermined pattern matching that of the magneto-optic modulator array 14 and in close proximity to the polarizing analyzer. The input ends of optical fibers 24 through 32 are positioned to individually confront pixels 15 through 23 and to permit light, after passing through the polarizing analyzer, to be received therefrom, in the input region of each individual optical fiber. The input ends of optical fibers 24 through 32 may also be coupled optically to pixels 15 through 23 by optical means other than close proximity depending on the overall configuration of the system of which the pixels and optical fibers are components. The output ends of optical fibers 24 through 32, identified by numerals 33 through 41, are arranged in a straight line 42 pointing downward and emitting light from the output region of each optical fiber end. The optical fiber output ends in line 42 are arranged according to a predetermined pattern different from that in which the input ends are arranged. The difference in the patterns between the input and output ends of the arrangement of optical fibers 24 through 32 provides for conversion of a rectangular pattern of modulated points of light to a straight line pattern. This arrangement of optical fibers is a rectangle-to-line converter.

Figure 3:
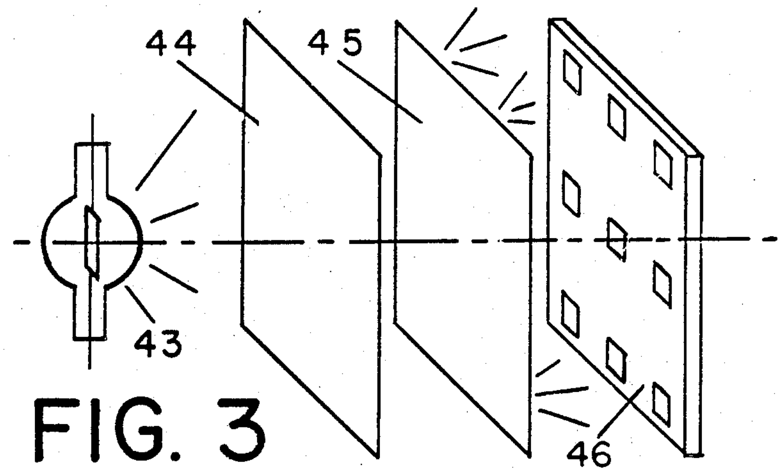
FIG. 3 illustrates one method of illuminating an array of light modulators.

FIG. 3 illustrates one method of illuminating an array of light modulators such as those shown in FIG. 2 an discussed above. 43 is a constant source of light. 44 is a filter to restrict the spectral range of light generated by light source 43 to a desired band of frequencies. 45 is a polarizing filter. 46 is an array of modulators, such as 14 shown in FIG. 2, arranged in accordance with a predetermined pattern. Light source 43 floods each pixel of modulator array 46 with light. If the modulator array 14 of FIG. 2 is illuminated in this way light passing through each of pixels 15 through 23 will overfill the input ends of optical fibers 24 through 32, since the pixel areas are large compared to the cross sectional areas of the optical fibers. Although each optical fiber will be overfilled with light, the illumination system of FIG. 3 is inefficient because much light is wasted.

Figure 4:
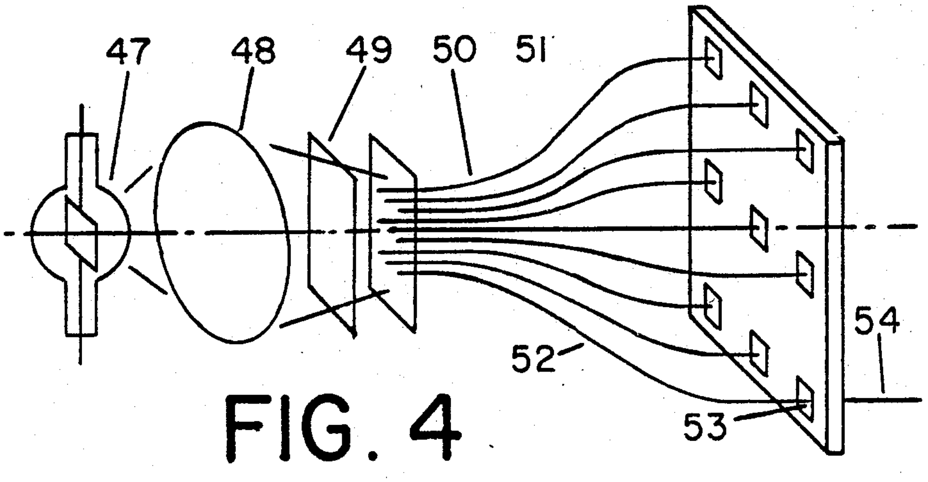
FIG. 4 illustrates a more efficient way to direct light into the pixels of a magneto-optic light modulator array.

FIG. 4 illustrates a more efficient way to direct light into the pixels of a magneto-optic light modulator array. 47 is a concentrated source of light. Lens 48 focusses light from source 47 onto the input end of fiber optic bundle 50 through filter 49. Light emitted from the output region of the output end of each optical fiber in fiber optic bundle 50 is directed into a particular pixel of the magneto-optic light modulator array 51. For example, light emanating from the output region of the output end of optical fiber 52 is directed into pixel 53. If the illumination system of FIG. 4 is combined with the magneto-optic light modulator array of FIG. 2 the light energy delivered to each pixel can be more concentrated than if the illumination system of FIG. 3 is used because no light energy is wasted on the areas between pixels where light is neither needed nor wanted. Optical fiber 54 corresponds to one optical fiber of the optical fiber array of FIG. 2. Light emanating from the output region of the output end of optical fiber 52 and passing through pixel 53 is directed towards optical fiber 54, but all of the light is not directed into optical fiber 54 because it is diverging. The optical system of FIG. 4 requires the addition of other optical elements to achieve maximum light efficiency. All of the optical fibers in optical fiber bundle 50 can be considered to be input fibers because they direct light into the pixels of the magneto-optic light modulator array. Similarly all of the optical fibers such as 24 through 32 of FIG. 2 and 54 of FIG. 4 can be considered to be output fibers because they transfer light from the pixels of the magneto-optic light modulator array 51 to locations where the light can be utilized for the intended purpose of the complete optical system.

Figure 5:
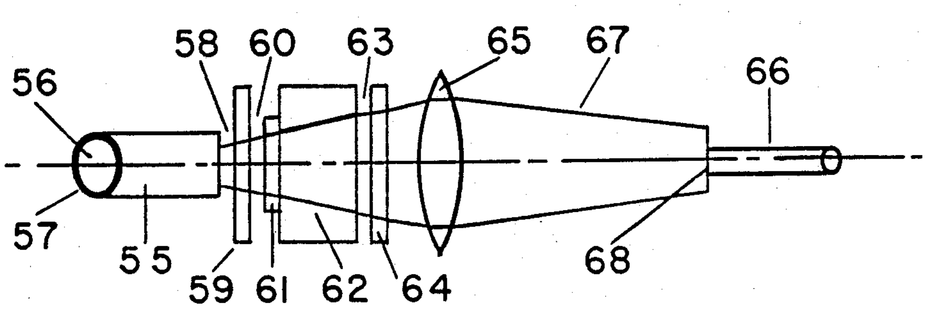
FIG. 5 illustrates the principle of an efficient optical system for transferring light from the output end of an input fiber to the input end of a corresponding output fiber.

FIG. 5 illustrates the principle of an efficient optical system for transferring light from the output end of an input fiber to the input end of a corresponding output fiber. 55 is an optical fiber such as 52 in FIG. 4 which illuminates a pixel of an array of epitaxial garnet on a nonmagnetic and transparent substrate such as 53 in FIG. 4 or any one of pixels 15 through 23 of FIG. 2 or pixels 3 and 4 FIG. 1. 56 is the core and 57 is the cladding of optical fiber 55. The area enclosed by the outer circumference of cladding 57 is the input end of optical fiber 55. The area enclosed by the circumference of core 56 is the input region of optical fiber 55. Optical fiber 55 extends from an input end to an output end. The output end is the area enclosed by the outer circumference of the cladding at the end of the fiber from which light emerges. The output region is the area enclosed by the circumference of the optical fiber core at the optical fiber output end. The length of the core between input and output regions is the region through or along which light can be propagated internally. The core and cladding of a conventional optical fiber each have different indices of refraction, but each is constant throughout the material. In a gradient index optical fiber, there is no cladding so that the input and output regions are the same as the input and output ends. The region between input and output ends through or along which light is propagated internally is the entire diameter of the fiber. The present discussion is concerned with conventional optical fibers. 58 is a small air space separating the output end of optical fiber 55 from polarizing filter 59. 60 can be either a small air space or optical cement between polarizing filter 59 and epitaxial garnet pixel 61 molecularly bonded to non-magnetic substrate 62. 63 is either a small airspace or optical cement between non-magnetic substrate 62 and polarizing filter 64. 65 is a lens in air forming an image of the output end of optical fiber 55 onto input face 68 of output fiber 66. A lens is necessary because light emerging from optical fiber 55 diverges. If output fiber 66 was located close to polarizing filter 64 the diverging light beam emerging from input optical fiber 55 would be larger than the input end of output optical fiber 66 and light transfer between these two optical fibers would be inefficient. Some gain in light transfer efficiency results if input fiber 55 is larger than output fiber 66. In the real world of device design tolerancing must be considered. Slight misalignment between optical fibers 55 and 66 can be compensated for by a diameter difference between them.

Lens 65 is shown in FIG. 5 as a singlet for purposes of illustration. If lenses such as 65 were used for the whole modulator array a flyseye set of lenses would be needed. A set of flyseye lenses, fabricated with state of the art techniques, might be designed for this application, but also might be F/number limited. Other lenses to perform the function of lens 65 will be discussed next.

Figure 6A:
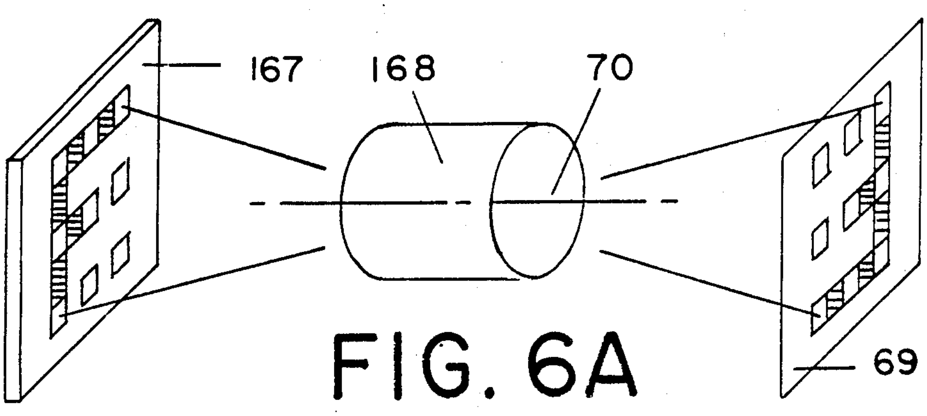
FIGS. 6A, 6B, and 6C illustrate three lens systems for imaging the pixels of a SIGHT-MOD (tm) or other modulator array onto an image plane where an array of optical fibers can be located to receive light modulated by the array.
Figure 6B:
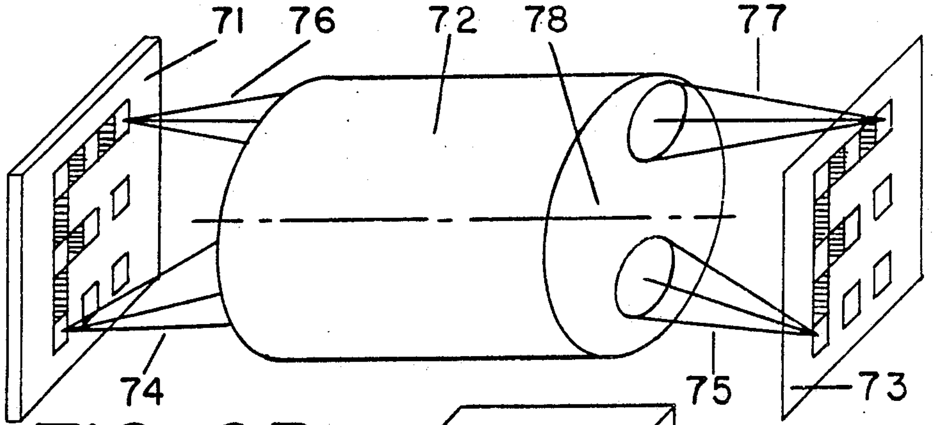
Figure 6C:
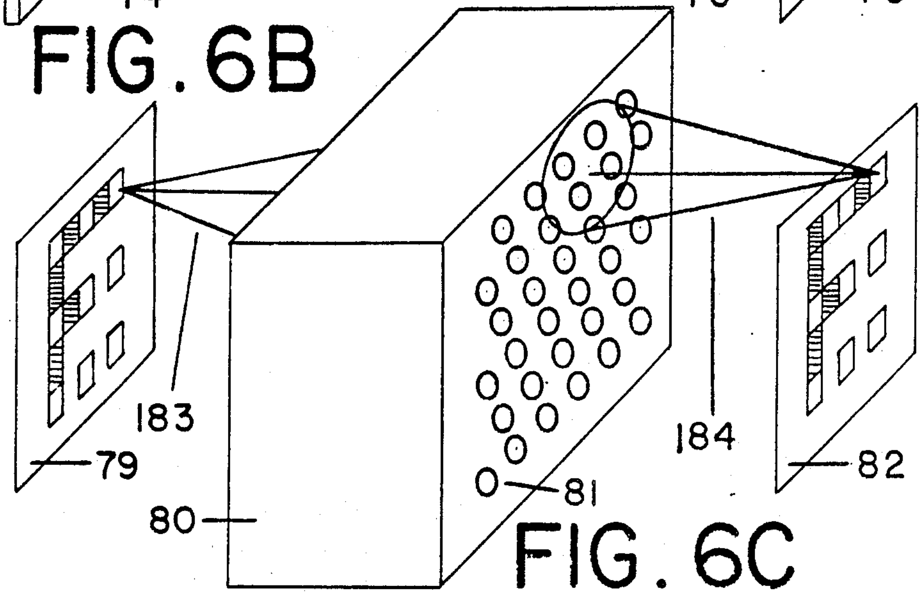

FIGS. 6A, 6B, and 6C illustrate three lens systems for imaging the pixels of a SIGHT-MOD (tm) or other modulator array onto an image plane where an array of optical fibers can be located to receive light modulated by the array. 167, 71, and 79 are arrays of nine pixels each of a SIGHT-MOD (tm) or other similar array. The shaded areas are not active but placed in the Figures to create the visual effect of the letter "F" to show image rotation when caused by the lens. In FIG. 6A the lens 168 is a conventional multi-element lens which images the array 167 to an image in plane 69. Here the image of the array is rotated 180 degrees about the optic axis 70 of the lens. In FIG. 6B the lens 72 is a complex lens which relays the image internally to create a final image that is in the same angular orientation about the optic axis 78 as the object. In the usual form of lens the chief ray of the bundle of rays 74 entering the lens from an object point and 75 leaving the lens to form an image point would not be parallel to the optic axis 78. Lens 72 can be a telecentric lens in which all chief rays are parallel to the optic axis. If lens 72 is telecentric, ray bundle 76 is typical of ray bundles leaving object points and ray bundle 77 is typical of ray bundles leaving the lens to form image points. The hallmark of a telecentric lens is that all chief rays are parallel to the optic axis 78. However, when critical lateral positioning of the image is necessary the object, image , and lens must be carefully aligned. Here the function of the lens is to image the output ends of an array of optical fibers onto the input ends of another optical fiber array and precision is necessary. In recent years gradient index lenses have been used successfully and may be used in this application. FIG. 6C illustrates the use of a rectangular group of gradient index rod lenses. Here the array is 79, the array image is 82, and the gradient index lens group is 80. 81 is one of the group of gradient index rod lenses. These are made of optical material in which the index of refraction varies from the center to the outer diameter. There is no single optical axis for the system as a whole, although each rod lens has an optical axis of its own, and the system is insensitive to lateral shifts in position. It is sensitive to angular changes in position and the image will shift if angle is changed. 183 represents a bundle of rays leaving an object point. The chief ray is parallel to the optic axes of the rod lenses. 184 represents the bundles of light leaving several rod lenses of the assembly to form a single image point. Such lens assemblies are produced and identified by one manufacturer as SELFOC (tm) lenses. A SELFOC (tm) lens array may be used in this application. In another part of the system a different SELFOC (tm) lens array is ideal.

The function of any lens or lens system forming a real image is to receive light from object points and direct it to image points. Each of the lenses and lens systems illustrated in FIGS. 6A, 6B, and 6C performs this function.

Figure 7:
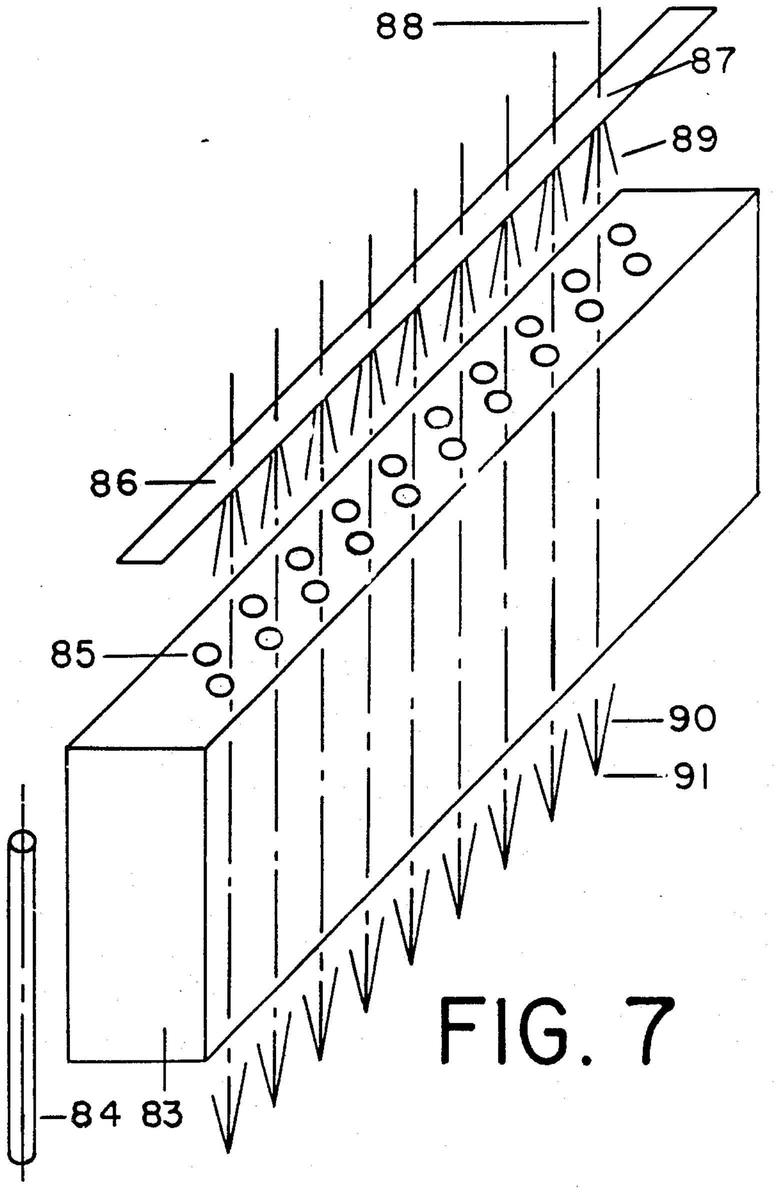
FIG. 7 illustrates a form of gradient index lens that is usually referred to as a linear lens.

FIG. 7 illustrates a form of gradient index lens that is usually referred to as a linear lens. In this case the glass rods with index varying from center to outer radius are located in rows with all optic axes parallel to each other and with end faces co-planar. They are closely packed in contact with each other and sealed into a fixed assembly. 83 represents such a linear lens. One manufacturer refers to such a lens as a SELFOC (tm) linear lens. 84 represents one rod as used in the linear lens 83. 85 is the end of one rod in the linear lens. 86 represents a linear arrangement of optical fibers so positioned that light leaving the output regions of the fiber output ends is directed into the linear lens 83 which confronts them. 87 is the output end of one optical fiber 88 of the arrangement. 89 is a cone of light leaving the optical fiber. 90 is a cone of light leaving the linear lens to form a point image 91 of the output region of the output end 87 of optical fiber 88. Cone of light 90 is actually a group of cones of light from several rod lenses which together form image 91. The linear lens forms images of all the output ends of optical fibers in the arrangement 88. When used as part of a print head in an electrophotographic printer the line of point images such as 91 would be focused onto a photoreceptor drum or belt.

Figure 8:
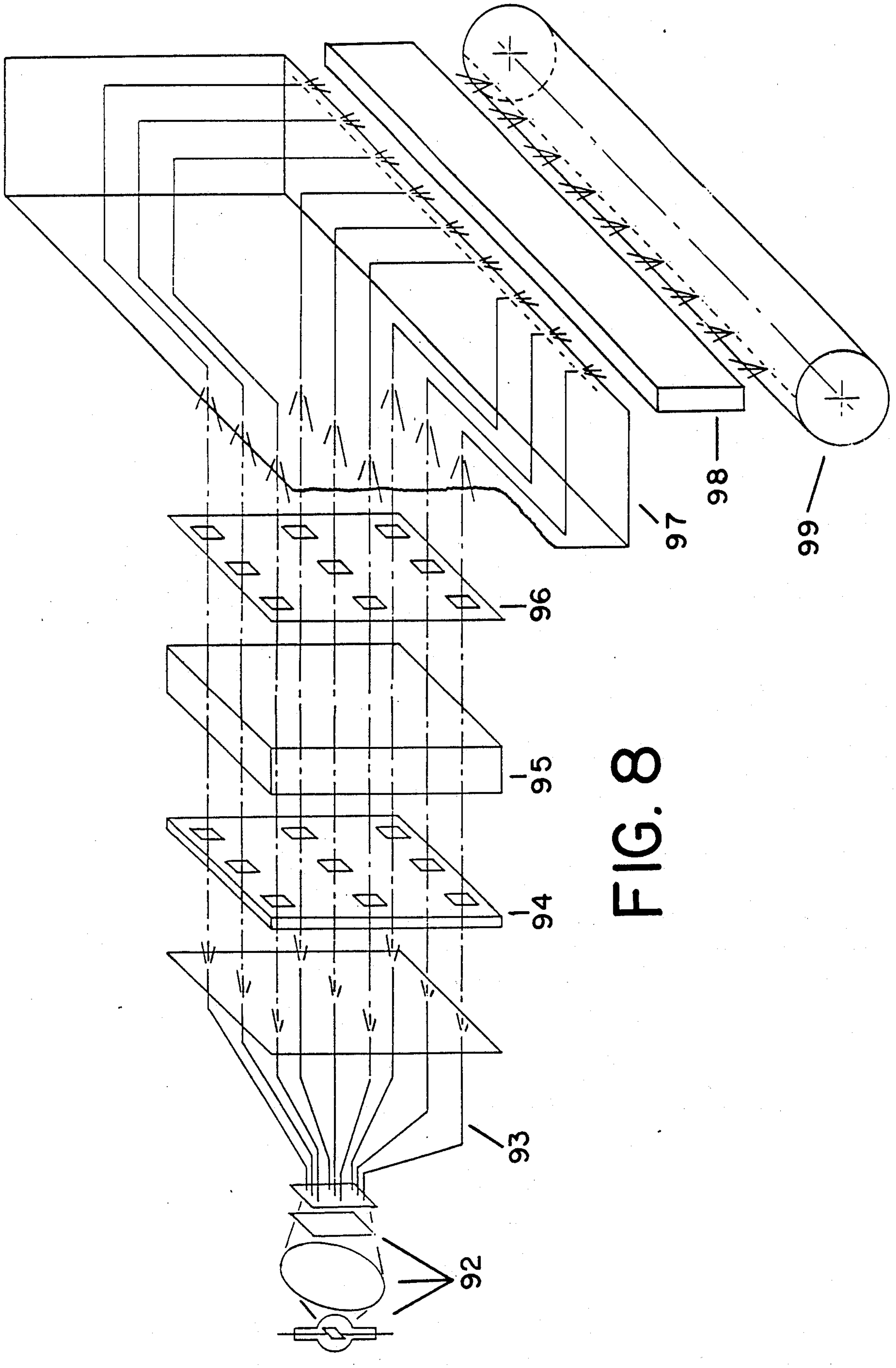
FIG. 8 illustrates a magneto-optical/fiber-optic digital print head utilizing components previously shown and described.

FIG. 8 illustrates a magneto-optic/fiber-optic digital print head utilizing components previously shown and described. 92 is an illumination system as shown in FIG. 4 including a light source, concentrating lens, and light filtert directing light into the input end of optical fiber arrangement, 93 also shown in FIG. 4. 94, an array of light modulators as shown in FIGS. 1, 4, and 5, may be an array of magneto-optic light modulators arranged in a predetermined pattern on different parts of the surface of a non-magnetic substrate, possibly transparent. 94 is shown in compressed form but has all the elements shown as 59 through 64 in the exploded view of FIG. 5. 95 is a rectangular grouping of gradient index rod lenses as shown in FIG. 6C. 95 could also be a lens such as of FIG. 6A or an erecting lens as shown in FIG. 6B, telecentric or not. 96 is an aerial image of the pixels of the modulator array 94 created by lens 95.

Some elements shown in FIG. 8 are shown in exploded view and some in their actual locations. Fiber optic arrangement 93 and modulator array 94 are shown in an exploded view. In use the output ends of the optical fibers of optical fiber arrangement 93 would be in close proximity to and directed towards or confronting the individual pixels of modulator array 94 as seen through the polarizing filter. Aerial image 96 is shown in an exploded view with respect to the input ends of the optical fibers in rectangle-to-line converter, optical fiber arrangement 97. In actual use the lens system 95 would image the output ends of optical fibers in optical fiber arrangement 93, as seen through the complete modulator array 94, directly onto the input ends of the optical fibers of the optical fiber arrangement 97, each through a separate pixel of modulator array 94. With any of the lens systems shown in FIG. 6 some distance would be required between optical fiber arrangement 93, the illuminating optical fiber arrangement, and rectangle-to-line optical fiber arrangement 97. FIG. 8 is representative of the actual relative locations of modulator array 94, lens assembly 95, and rectangle-to-line optical fiber converter arrangement 97. In the case of a typical gradient lens group, as in FIG. 6C, the distance between 94 and 96 would be approximately 66 mm. The output ends of the optical fiber rectangle-to-line converter 97 are in a straight line and so located as to direct their light into the linear lens 98 which images their output regions onto a photoreceptor as a straight line of aerial images. If 98 is a typical gradient index SELFOC (tm) linear lens the distance between objects and images will be about 66 mm. There are other forms of linear lens using strip lenses which can perform the same function as 98.

FIG. 8 shows a photoreceptor drum 99 on the surface of which are focussed aerial images of the ends of the output optical fibers in the rectangle-to-line converter optical arrangement 97 from which modulated light emerges. Photoreceptor 97 is actually a part of a xerographic engine and is not a part of this invention. The aerial image of the line of spots of light could just as well be located on a belt photoreceptor, dry silver paper, other light sensitive surface or remain as an aerial image.

The magneto-optic/fiber-optic digital print head illustrated in FIG. 8 comprises:

a concentrated source of light, a condensing system forming a small concentrated image of the light source, a filter to select a desired band of light frequencies, an input optical fiber arrangement having the optical fibers closely spaced at the input end where light is received from the light source image and having the optical fibers arranged in a pre-determined pattern at the output end where light emerges from each optical fiber, an array of magneto-optic light modulators, each on a different part of the surface of a single body and within a single body, arranged in a predetermined pattern matching that of the output end of the input optical fiber arrangement with each pixel of the modulator array confronting the output region of an optical fiber of the input optical fiber arrangement to receive light emerging therefrom, a lens system forming an aerial image of the output regions of the optical fibers of the input optical fiber arrangement as seen through the pixels of the magneto-optic modulator array, an arrangement of output optical fibers configured as a rectangle-to-line converter with the input regions of the optical fibers arranged in a predetermined pattern coinciding with that in the aerial image of the output regions of the input optical fiber arrangement to receive light from each optical fiber image in the aerial image so that the input region of each optical fiber in the output optical fiber arrangement will receive light from a preselected image of the output region of an optical fiber of the input optical fiber arrangement and with the output regions of the optical fibers in the output optical fiber arrangement located in a straight line, a linear lens assembly confronting the output regions of the optical fibers in the straight line output end of the rectangle-to-line arrangement of output optical fibers to receive light emerging from the output region of each optical fiber in the line and form an image of the line of optical fiber output regions in air or on a suitable photoreceptor.

What is claimed is:

1. An optical system for separately and independently modulating or on-off switching light in each of a multiplicity of separately propagated light beams, including, an array of a multiplicity of optical fibers, each having an input region at which light can enter and be received, a region through or along which light can be propagated internally, and an output region from which light can emerge, the disposition of the array being such that light can be directed into and be received at the input region of each optical fiber and light leaving the output region of each optical fiber emerges at a predesignated one of a set of predetermined separate positions propagated along a predesignated one of a set of predetermined separate directions, a first optical polarizer, optical means to receive light propagated from the output region of each optical fiber of the array and direct it through the first optical polarizer to a prespecified one of a set of preselected separate locations, an arrangement of a multiplicity of magneto-optic light modulators, each on a different part of the surface of a single body, each having an input region at which light can enter and be received, a region in which light can be modulated, and an output region from which modulated light can emerge, each magneto-optic light modulator of the arrangement being controlled separately electrically or electronically to modulate the received light, the disposition of the arrangement being such that the input region of each magneto-optic light modulator of the arrangement coincides with a preestablished one of the set of preselected separate locations and can receive light propagated from a prescribed optical fiber of the array through the optical means and the first optical polarizer, a second optical polarizer.

whereby light beams passing through the optical fiber array, the optical means, the first optical polarizer, the magneto-optic light modulator arrangement, and the second optical polarizer constitutes separately and independently modulated separately propagated light beams.

2. An optical system according to claim 1, wherein the multiplicity of magneto-optic light modulators is a SIGHT-MOD (tm) array of magneto-optic light modulators.

3. An optical system according to claim 1, wherein the optical means is an optical element of a thin transparent space between the output regions of the optical fibers in the array of optical fibers and the first optical polarizer and the arrangement of a multiplicity of magneto-optic light modulators is such that the input region of each magneto-optic light modulator of the arrangement is separated from the first optical polarizer by a thin transparent space.

4. An optical system for separately and independently modulating or on-off switching light in each of a multiplicity of separately propagated light beams, including, optical light source means, optical condensing means receiving light emitted by and propagated from the optical light source means and concentrating it within a set of predelineated small regions, an array of a multiplicity of optical fibers, each having an input region at which light can enter and be received, a region through or along which light can be propagated internally, and an output region from which light can emerge, the disposition of the array being such that light enters the input region of each optical fiber at one of the set of predelineated small regions and light leaving the output region of each optical fiber emerges at a predesignated one of a set of predetermined separate positions propagated along a predesignated one of a set of predetermined separate directions, and a first optical polarizer, optical means to receive light propagated from the output region of each optical fiber of the array and direct it through the first optical polarizer to a prespecified one of a set of preselected locations, an arrangement of a multiplicity of magneto-optic light modulators, each on a different part of the surface of a single body, each having an input region at which light can enter and be received, a region in which light can be modulated, and an output region from which modulated light can emerge, each magneto-optic light modulator of the arrangement being controlled separately electrically or electronically to modulate the received light, the disposition of the arrangement being such that the input region of each magneto-optic light modulator of the arrangement coincides with a preestablished one of the set of preselected separate locations and receives light propagated from a prescribed optical fiber of the array through the optical means and the first optical polarizer, and a second optical polarizer, whereby light beams passing through the optical fiber array, the optical means, the first optical polarizer, the magneto-optic light modulator arrangement, and the second optical polarizer constitutes separately and independently modulated separately propagated light beams.

5. An optical system according to claim 4, wherein the multiplicity of magneto-optic light modulators is a SIGHT-MOD (tm) array of magneto-optic light modulators.

6. An optical system for separately and independently modulating or on-off switching light in each of a multiplicity of separately propagated light beams, including, a first optical polarizer, an arrangement of a multiplicity of magneto-optic light modulators, each on a different part of the surface of a single body, each having an input region at which light can enter and be received, a region in which light can be modulated, and an output region from which modulated light can emerge, each magneto-optic light modulator of the arrangement being controlled separately electrically or electronically to modulate the received light, the disposition of the arrangement being such that light can be directed into and be received at the input region of each magneto-optic light modulator and light leaving the output region of each magneto-optic light modulator emerges at a preassigned one of a set of preselected separate positions propagated along a preassigned one of a set of preselected separate directions, a second optical polarizer, optical means to receive light propagated from the output region of each magneto-optic light modulator of the arrangement through the second polarizer and direct it to a prespecified one of a set of preselected separate locations, and an array of a multiplicity of optical fibers, each having an input region at which light can enter and be received, a region through or along which light can propagated internally, and an output region from which light can emerge, the disposition of the array being such that the input region of each optical fiber of the array coincides with a preidentified one of the set of preselected separate locations and can receive light propagated from a preappointed magneto-optic light modulator of the arrangement through the optical means and the second optical polarizer, the disposition of the array being such that light leaving the output region of each optical fiber emerges at a preidentified one of a set of preplanned separate placements propagated along one of a set of preplanned separate directions, whereby light beams passing through the first optical polarizer, the magneto-optic light modulator arrangement, the second optical polarizer, the optical means, and the optical fiber array constitutes separately and independently modulated separately propagated light beams.

7. An optical system according to claim 6, wherein the multiplicity of magneto-optic light modulators is a SIGHT-MOD (tm) array of magneto-optic light modulators.

8. An optical system according to claim 6, wherein the optical means is a flyseye lens.

9. An optical system according to claim 6, wherein the optical means is a conventional finite conjugate lens.

10. An optical system according to claim 6, wherein the optical means is a telecentric conventional finite conjugate lens.

11. An optical system according to claim 6, wherein the optical means is a group of gradient index rod lenses.

12. An optical system for separately and independently modulating on-off switching light in each of a multiplicity of separately propagated light beams, including a first array of a multiplicity of optical fibers, each having an input region at which light can enter and be received, a region through or along which light can be propagated internally, and an output region from which light can emerge, the disposition of the first array being such that light can be directed into and received at the input region of each optical fiber and light leaving the output region of each optical fiber emerges at a predesignated one of a first set of predetermined separate positions propagated along a predesignated one of a first set of predetermined separate directions, a first optical polarizer, first optical means to receive light propagated from the output region of each optical fiber of the first array and direct it through the first optical polarizer to a prespecified one of a first set of preselected separate locations, an arrangement of a multiplicity of magneto-optic light modulators, each on a different part of the surface of a single body, each having an input region at which light can enter and be received, a region in which light can be modulated, and an output region from which modulated light can emerge, each magnetooptic light modulator of the arrangement being controlled separately electrically or electronically to modulate the received light, the disposition of arrangement being such that the input region of each magneto-optic light modulator of the arrangement coincides with a preestablished one of the first set of preselected separate locations and can receive light propagated from a prescribed optical fiber in the first array through the first optical means and the first optical polarizer, and light leaving each magneto-optic light modulator of the arrangement emerges at a preassigned one of a set of preselected separate positions propagated along a preassigned one of a set of preselected separate directions, a second optical polarizer, second optical means to receive light propagated from the output region of each magneto-optic modulator of the arrangement through the second optical polarizer and direct it to a prespecified one of a second set of preselected separate locations, and a second array of a multiplicity of optical fibers, each having an input region at which light can enter and be received, a region through or along which light can be propagated internally, and an output region from which light can emerge, the disposition of the second array being such that the input region of each optical fiber coincides with a preidentified one of the second set of preselected separate locations and can receive light propagated from a preappointed magneto-optic light modulator of the arrangement through the second optical polarizer and the second optical means, the disposition of the second array being such that light leaving the output region of each optical fiber emerges at a preidentified one of a set of preplanned placements propagated along one of a set of preplanned separate directions, whereby light beams passing through the first optical fiber array, the first optical means, the first optical polarizer, the magneto-optic light modulator arrangement, the second optical polarizer, the second optical means, and the second optical fiber array constitutes separately and independently modulated separately propagated light beams.

13. An optical system according to claim 12, wherein the multiplicity of magneto-optic light modulators is a SIGHT-MOD (tm) array of magneto-optic light modulators.

14. An optical system according to claim 12, wherein individual optical fiber output ends of the set of preplanned placements of optical fiber output ends in the second optical fiber array are equally spaced along a straight line.

15. An optical system for separately and independently modulating or on-off switching light in each of a multiplicity of separately propagated light beams, including optical light source means, optical condensing means receiving light emitted by and propagated from the optical light source means and concentrating it within a set of predelineated small regions, a first array of a multiplicity of optical fibers, each having an input region at which light can enter and be received, a region through or along which light can be propagated internally, and an output region from which light can emerge, the disposition of the first array being such that light enters the input region of each optical fiber at one of the set of predelineated small regions and light leaving the output region of each optical fiber emerges at a predesignated one of a first set of predetermined separate positions propagated along a predesignated one of a first set of predetermined separate directions, a first optical polarizer, first optical means to receive light propagated from the output region of each optical fiber of the first array and direct it through the first optical polarizer to a prespecified one of a first set of preselected separate locations, an arrangement of a multiplicity of magneto-optic light modulators, each on a different part of the surface of a single body, each having an input region at which light can enter and be received, a region in which light can be modulated, and an output region from which modulated light can emerge, each magneto-optic light modulator of the arrangement being controlled separately electrically or electronically to modulate the received light, the disposition of arrangement being such that the input region of each magneto-optic light modulator of the arrangement coincides with a preestablished one of the first set of preselected separate locations and receives light propagated from a prescribed optical fiber in the first array through the first optical means and the first optical polarizer, and light leaving each magneto-optic light modulator of the arrangement emerges at a preassigned one of a set of preselected separate positions propagated along a preassigned one of a set of preselected separate directions, a second optical polarizer, second optical means to receive light propagated from the output region of each magneto-optic modulator of the arrangement through the second optical polarizer and direct it to a prespecified one of a second set of preselected separate locations, and a second array of a multiplicity of optical fibers, each having an input region at which light can enter and be received, a region through or along which light can be propagated internally, and an output region from which light can emerge, the disposition of the second array being such that the input region of each optical fiber coincides with a preidentified one of the second set of preselected separate locations and receives light propagated from a preappointed magneto-optic light modulator of the arrangement through the second optical polarizer and the second optical means, the disposition of the second array being such that light leaving the output region of each optical fiber emerges at a preidentified one of a set of preplanned placements equally spaced along a straight line and propagated along one of a set of preplanned separate directions, a third optical means imaging the output ends of the optical fibers in the second optical fiber array to an aerial image, whereby light beams originating in the light source means and passing through the optical condensing means, the first optical fiber array, the first optical means, the first optical polarizer, the magneto-optic light modulator arrangement, the second optical polarizer, the second optical means, the second optical fiber array, and the third optical means constitutes separately and independently modulated separately propagated light beams in a magneto-optic and fiber optic digital print head.

16. An optical system according to claim 15, wherein the multiplicity of magneto-optic light modulators is a SIGHT-MOD (tm) array of mageto-optic light modulators.

17. An optical system according to claim 15, wherein the third optical means is a linear lens assembly.

18. An optical system according to claim 15, wherein the third optical means is a linear lens assembly composed of gradient index rod lenses.

* * * * *